US00RE44121E

(19) United States
(12) Reissued Patent
Park

(10) Patent Number: US RE44,121 E
(45) Date of Reissued Patent: Apr. 2, 2013

(54) COPY PREVENTION METHOD AND APPARATUS OF A DIGITAL RECORDING/REPRODUCING SYSTEM

(75) Inventor: Tae Joon Park, Daegu (KR)
(73) Assignee: LG Electronics Inc., Seoul (KR)

(21) Appl. No.: 12/318,745
(22) Filed: Jan. 7, 2009

Related U.S. Patent Documents

Reissue of:
(64) Patent No.: 5,689,559
Issued: Nov. 18, 1997
Appl. No.: 08/566,000
Filed: Dec. 1, 1995

U.S. Applications:
(63) Continuation of application No. 09/592,148, filed on Jun. 12, 2000, now abandoned, which is a continuation of application No. 09/094,575, filed on Jun. 12, 1998, now Pat. No. Re. 37,052.

(30) Foreign Application Priority Data

Dec. 8, 1994 (KR) ..... 33336/1994

(51) Int. Cl.
*G06F 21/00* (2006.01)
*G06F 1/00* (2006.01)
*H04N 7/167* (2006.01)
*H04N 5/913* (2006.01)
*G11B 20/00* (2006.01)

(52) U.S. Cl. ..... 380/203; 380/239; 360/60; 386/252; 386/359; 386/E5.004; 705/57

(58) Field of Classification Search ..... 380/203, 380/239, 22; 360/60; 705/50, 51, 57
See application file for complete search history.

(56) References Cited

U.S. PATENT DOCUMENTS 3,753,228 A 8/1973 Nickolas et al.
4,420,829 A 12/1983 Carlson (Continued)

FOREIGN PATENT DOCUMENTS

CN 1085723 A 4/1994
EP 0 267 039 A2 5/1988

(Continued)

OTHER PUBLICATIONS

MPEG-2 Systems Working Draft, ISO/IEC/JTC1/SC29/WG11/N0601, Nov. 1993.*

(Continued)

*Primary Examiner* — Calvin L Hewitt, II
*Assistant Examiner* — Mohammad A Nilforoush
(74) *Attorney, Agent, or Firm* — Birch, Stewart, Kolasch & Birch, LLP

(57) ABSTRACT

[A copy prevention method and apparatus of a digital magnetic recording/reproducing system performs the copy prevention function by encoding to insert a marker involving copy prevention function information and executing the function and allows a program supplier to realize a desired copy prevention function of various patterns, in which the marker formed by a control word for scrambling audio and video bit straps and copy prevention information for preventing an illegal copy is encrypted by an encoded key to be multiplexed with the audio and video bit strips scrambled by the control word. The marker transmitted is detected from the bit strips to be decrypted and analyzed by the encoded key to determine whether the copy is permitted or not, so that the detected marker is updated to be recorded on a video tape and the control word is produced from the marker to perform the descrambling to supply the result to a monitor to be displayed. Thus, the program supplier selects the copy prevention function, and a separate format converting apparatus is not required since a field defined within a GA format is utilized while an existing DVCR is not need to be changed for performing the copy prevention function as the data amount to be recorded is not increased.] *A method and apparatus for transmitting digital data are discussed. According to an embodiment, the invention is directed to a method of transmitting digital data using a data processing apparatus including a scrambler, the method comprising: scrambling, by the scrambler, one or more data units included in the digital data based on control data, the digital data including a first data block and one or more succeeding data blocks, each data block including a header and one data unit, at least the header in the first data block including the control data, wherein the first data block and the one or more succeeding data blocks are scrambled based on the control data included in the first data block; and transmitting, by the data processing apparatus, the one or more scrambled data units and the control data, the control data being used for controlling a parameter of a scrambling/descrambling operation.*

8 Claims, 5 Drawing Sheets

U.S. PATENT DOCUMENTS

| | | | | |
|---|---|---|---|---|
| 4,554,461 | A | | 11/1985 | Oho et al. |
| 4,694,489 | A | | 9/1987 | Frederiksen |
| 4,736,422 | A | | 4/1988 | Mason |
| 4,796,220 | A | | 1/1989 | Wolfe |
| 4,802,215 | A | | 1/1989 | Mason |
| 4,817,140 | A | | 3/1989 | Chandra et al. |
| 4,871,140 | A | | 10/1989 | Hoskinson et al. |
| 4,890,319 | A | | 12/1989 | Seth-Smith et al. |
| RE33,189 | E | | 3/1990 | Lee et al. |
| 4,916,738 | A | | 4/1990 | Chandra et al. |
| 4,924,513 | A | | 5/1990 | Herbison et al. |
| 4,937,679 | A | | 6/1990 | Ryan |
| 4,965,680 | A | | 10/1990 | Endoh |
| 4,975,952 | A | | 12/1990 | Mabey et al. |
| 4,999,806 | A | | 3/1991 | Chernow et al. |
| 5,003,590 | A | | 3/1991 | Lechner et al. |
| 5,014,274 | A | | 5/1991 | Higurashi et al. |
| 5,034,981 | A | | 7/1991 | Leonard et al. |
| 5,034,985 | A | | 7/1991 | Keough |
| 5,054,064 | A | | 10/1991 | Walker et al. |
| 5,057,947 | A | | 10/1991 | Shimada et al. |
| 5,058,162 | A | | 10/1991 | Santon et al. |
| 5,073,925 | A | | 12/1991 | Nagata et al. |
| 5,109,413 | A | | 4/1992 | Comerford et al. |
| 5,134,656 | A | | 7/1992 | Kudelski |
| 5,138,659 | A | | 8/1992 | Kelkar et al. |
| 5,144,658 | A | | 9/1992 | Takahashi |
| 5,159,633 | A | | 10/1992 | Nakamura |
| 5,182,680 | A | * | 1/1993 | Yamashita et al. ..... 360/60 |
| 5,193,176 | A | | 3/1993 | Brandin |
| 5,231,546 | A | | 7/1993 | Shimada et al. |
| 5,233,650 | A | | 8/1993 | Chan |
| 5,243,650 | A | | 9/1993 | Roth et al. |
| 5,260,999 | A | | 11/1993 | Wyman |
| 5,265,164 | A | | 11/1993 | Matyas et al. |
| 5,289,276 | A | | 2/1994 | Siracusa et al. |
| 5,303,294 | A | | 4/1994 | Kimoto et al. |
| 5,315,448 | A | | 5/1994 | Ryan |
| 5,323,244 | A | | 6/1994 | Yamaguchi et al. |
| 5,377,266 | A | | 12/1994 | Katta et al. |
| 5,381,481 | A | | 1/1995 | Gammie et al. |
| 5,392,351 | A | | 2/1995 | Hasebe et al. |
| 5,406,625 | A | | 4/1995 | Kotaka et al. |
| 5,418,853 | A | | 5/1995 | Kanota et al. |
| 5,442,541 | A | | 8/1995 | Hube et al. |
| 5,469,272 | A | * | 11/1995 | Kubota et al. ..... 386/75 |
| 5,477,276 | A | | 12/1995 | Oguro et al. |
| 5,504,816 | A | | 4/1996 | Hamilton et al. |
| 5,506,903 | A | | 4/1996 | Yamashita et al. |
| 5,513,260 | A | | 4/1996 | Ryan |
| 5,530,756 | A | | 6/1996 | Bourel et al. |
| 5,546,461 | A | | 8/1996 | Ibaraki et al. |
| 5,563,946 | A | | 10/1996 | Cooper et al. |
| 5,574,787 | A | | 11/1996 | Ryan |
| 5,576,843 | A | | 11/1996 | Cookson et al. |
| 5,579,120 | A | | 11/1996 | Oguro et al. |
| 5,583,562 | A | | 12/1996 | Birch et al. |
| 5,588,058 | A | | 12/1996 | Le Berre et al. |
| 5,590,306 | A | | 12/1996 | Watanabe et al. |
| 5,629,980 | A | | 5/1997 | Stefik et al. |
| 5,638,513 | A | | 6/1997 | Ananda |
| 5,646,992 | A | | 7/1997 | Subler et al. |
| 5,659,613 | A | | 8/1997 | Copeland et al. |
| 5,673,357 | A | | 9/1997 | Shima et al. |
| 5,689,559 | A | | 11/1997 | Park et al. |
| 5,689,561 | A | | 11/1997 | Pace |
| 5,703,859 | A | | 12/1997 | Tahara et al. |
| 5,715,403 | A | | 2/1998 | Stefik |
| 5,757,909 | A | | 5/1998 | Park et al. |
| 5,757,910 | A | | 5/1998 | Rim et al. |
| 5,761,302 | A | | 6/1998 | Park et al. |
| 5,778,064 | A | | 7/1998 | Kori et al. |
| 5,790,664 | A | | 8/1998 | Coley et al. |
| 5,799,081 | A | | 8/1998 | Kim et al. |
| 5,832,084 | A | | 11/1998 | Park et al. |
| 5,862,115 | A | | 1/1999 | Matsui et al. |
| 5,881,038 | A | | 3/1999 | Oshima et al. |
| 5,898,695 | A | | 4/1999 | Fujii et al. |
| 5,907,443 | A | | 5/1999 | Hirata et al. |
| 5,910,987 | A | | 6/1999 | Ginter et al. |
| 5,925,127 | A | | 7/1999 | Ahmad |
| 5,956,505 | A | | 9/1999 | Manduley |
| 6,009,401 | A | | 12/1999 | Horstmann |
| 6,028,932 | A | | 2/2000 | Park et al. |
| 6,052,242 | A | | 4/2000 | Hirata |
| RE36,763 | E | | 7/2000 | Kanota et al. |
| 6,236,971 | B1 | | 5/2001 | Stefik et al. |
| 6,430,290 | B1 | | 8/2002 | Van Willigen et al. |
| 7,069,250 | B2 | | 6/2006 | Meadow et al. |
| 7,114,745 | B2 | | 10/2006 | Schutz et al. |

FOREIGN PATENT DOCUMENTS

| | | | |
|---|---|---|---|
| EP | 0 498 617 | A2 | 8/1992 |
| EP | 0 519 320 | A2 | 12/1992 |
| EP | 0 580 367 | A2 | 1/1994 |
| EP | 0 581 227 | A2 | 2/1994 |
| EP | 0 589 459 | A1 | 3/1994 |
| JP | 6-70282 | A | 3/1994 |
| JP | 6-162690 | A | 6/1994 |
| JP | 06-199288 | A | 7/1994 |
| JP | 6-339110 | A | 12/1994 |

OTHER PUBLICATIONS

Wasilewski, Anthony J., "MPEG-2 Systems Specification: Blueprint for Network Interoperability," Communications Technology, Feb. 1994.*

White, R. et al., "How Computers Work", Millennium Edition, 1999, Que Corporation, Indianapolis, IN.

Derfler, F. et al., "How Networks Work", Bestseller Edition, 1996, Ziff-Davis Press, Emeryville, CA.

Gralla, P. et al., "How the Internet Works", Millennium Edition, 1999, Que Corporation, Indianapolis, IN.

Muller, N. et al., "Desktop Encyclopedia of the Internet", Artech House Inc., 1999, Norwood, MA.

ISO/IEC 13818-1, "Information Technology—Generic Coding of Moving Pictures and Associated Audio: Systems" International Standard. Nov. 13, 1994, 1-144 (all pages).

ISO/IEC, 13818-2, "Information Technology—Generic Coding of Moving Pictures and Associated Audio Information: Video", International Standard, 1995, pp. 1-243 (all pages).

Strunk et al., "The Elements of Style", 3rd Edition, 1979, MacMillan Publ. Co., Inc., all pages.

U.S. Appl. No. 12/405,011, filed Mar. 16, 2009.

U.S. Appl. No. 12/405,053, filed Mar. 16, 2009.

* cited by examiner

COPY PREVENTION METHOD AND APPARATUS OF A DIGITAL RECORDING/REPRODUCING SYSTEM

Matter enclosed in heavy brackets [ ] appears in the original patent but forms no part of this reissue specification; matter printed in italics indicates the additions made by reissue.

*This reissue application is a Continuation Application of Reissue application Ser. No. 09/592,148 (now abandoned) filed Jun. 12, 2000, which is a Continuation of Reissue application Ser. No. 09/094,575 filed Jun. 12, 1998 (now Pat. No. Re. 37,052), which is a Reissue of U.S. Pat. No. 5,689,559, issued on Nov. 18, 1997 (U.S. application Ser. No. 08/566, 000), all these applications are incorporated by reference. The present application also claims priority of Application No. 33336/1994 filed in Republic of Korea on Dec. 8, 1994 under 35 U.S.C. §119. Note: More than one reissue application has been filed for the reissue of U.S. Pat. No. 5,689,559. The reissue applications are application Ser. No. 09/097,162 (Now Pat. No. Re. 36,919) filed Jun. 12, 1998, Ser. No. 09/094, 575 (now Pat. No. Re. 37,052) filed Jun. 12, 1998, and Ser. No. 09/592,148 (now abandoned) filed Jun. 12, 2000; as well as Ser. No. 11/826,679 (now abandoned) filed Jul. 17, 2007, Ser. No. 11/826,680 filed Jul. 17, 2007, Ser. No. 11/826,681 (now abandoned) filed Jul. 17, 2007, Ser. No. 11/826,682 filed Jul. 17, 2007, Ser. No. 11/902,930 (now abandoned) filed Sep. 26, 2007, Ser. No. 12/179,432 (now abandoned) filed Jul. 24, 2008, Ser. No. 12/179,443 (now abandoned) filed Jul. 24, 2008, Ser. No. 12/179,453 (now abandoned) filed Jul. 24, 2008, Ser. No. 12/184,152 (now abandoned) filed Jul. 31, 2008, and Ser. No. 12/621,430 (now abandoned) filed Nov. 18, 2009, all of which are continuations of Ser. No. 09/592, 148; and Ser. No. 12/318,742 filed Jan. 7, 2009, Ser. No. 12/318,743 (now abandoned) filed Jan. 7, 2009, Ser. No. 12/318,744 (now abandoned) filed Jan. 7, 2009, Ser. No. 12/318,745 (present application) filed Jan. 7, 2009, and Ser. No. 12/318,746 filed Jan. 7, 2009, all of which are divisionals of Ser. No. 09/592,148; and Ser. No. 12/641,258 (now abandoned) filed Dec. 17, 2009, Ser. No. 12/641,273 (now abandoned) filed Dec. 17, 2009, and Ser. No. 12/641,266 (now abandoned) filed Dec. 17, 2009, all of which are continuations of Ser. No. 11/826,681, which is a continuation of Ser. No. 09/592,148.*

BACKGROUND OF THE INVENTION

1. Field of the Invention

The present invention relates to a copy prevention method and apparatus of a digital [magnetic] recording/reproducing system, and more particularly to a copy prevention method and apparatus of a digital [magnetic] recording/reproducing system, wherein a marker [involving copy prevention function information and executing the function is coded and inserted to perform the copy prevention function and realize the copy prevention function of various patterns desired by a program supplier] *includes control data for descrambling digital data*.

2. Description of the Prior Art

One example of a conventional copy prevention method is described in U.S. Pat. No. 4,819,098, in which a signal inducing an interference to an automatic gain controller (AGC) circuit within a VCR is inserted to a video waveform to be recorded on a tape. When the tape is reproduced to display the signal on a television, the interference signal does not affect the AGC circuit of the television [to allow], *allowing* for a normal display.

However, when the reproduced signal is recorded by another VCR, i.e., when it is duplicated, the interference signal brings about [the] interference in the AGC circuit of the *recording* VCR [to record in] *causing* an inaccurate signal level *to be recorded*. Accordingly, the nodal display cannot be attained when reproducing a duplicated tape.

As another example, U.S. Pat. No. 4,571,642 utilizes a control track employed during performing the reproduction for synchronizing a servo circuit within a VCR, [thereby] *for* embodying the copy prevention function. The basic concept of this patent is for altering a video signal to force the control track to be inaccurately recorded when the video signal is duplicated onto another tape.

Still another example is disclosed in U.S. Pat. No. 4,577, 216, in which a phase noise or the like is inserted [to] *in* a chroma burst portion of a video signal to thereby embody the copy prevention function.

The above-mentioned methods [are for using] *use* a difference [of] *between the* sensitivity [between] *of* circuits [of] *in* a television and [of] a VCR. [Thus, the copy prepared to prevent the copy thereof as above may not exert the copy prevention function in a certain VCR, but may not execute a normal display on a certain television.]

The above copy prevention methods are of an analog system, which are available for preventing the copy of an NTSC-class video signal to an analog VCR. However, in case of a high-definition image of the analog television (ATV), the copy is performed by means of a digital VCR rather than an analog VCR, so that it is difficult to employ the copy prevention method of the analog system.

SUMMARY OF THE INVENTION

Therefore, it is an object of the present invention to provide a copy prevention method and apparatus of a digital [magnetic] recording/reproducing system [applicable to a digital VCR and incorporated with various copy prevention functions to enable the selection of a copy prevention function desired by a program supplier].

[To achieve the above object of the present invention, there is provided a copy prevention method of a digital magnetic recording/reproducing system, which is performed by an audio and video signal transmitting process and an audio and video signal receiving/recording process. The audio and video signal transmitted process is carried out in the sequence of encrypting a marker formed by a control word for scrambling audio and video bit strips and copy prevention information for preventing an illegal copy by means of an encoding key, and multiplexing the marker with the audio and video bit strips scrambled by the control word. Then, the audio and video signal receiving/recording process is performed in the sequence of detecting the marker from the transmitted bit strips, decrypting and analyzing the detected marker by means of an encoded key to determine whether copy is permitted or not, updating the detected marker to be recorded on a video tape, and generating the control word from the marker to perform a descrambling and supply the audio and video signals to be displayed on a monitor.]

[Also, a copy prevention apparatus of a digital magnetic recording/reproducing system includes a marker detecting and inserting part for detecting a marker from input bit strips, and inserting the updated marker to the bit strips to output the result. A marker analyzing and processing part decrypts and analyzes the encrypted marker from the marker detecting and inserting part by means of an encoded key, outputs a control word for descrambling the bit strips, and updates and encrypting the decrypted marker by means of the encoded key to output the result. In addition, a buffer part buffers the control word and updated and encrypted marker from the marker analyzing and processing section, and inserts the updated and encrypted marker in the marker detecting and inserting part, and a descrambler descrambles the bit strips provided via the marker detecting and inserting part by means of the control word from the buffer part.]

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
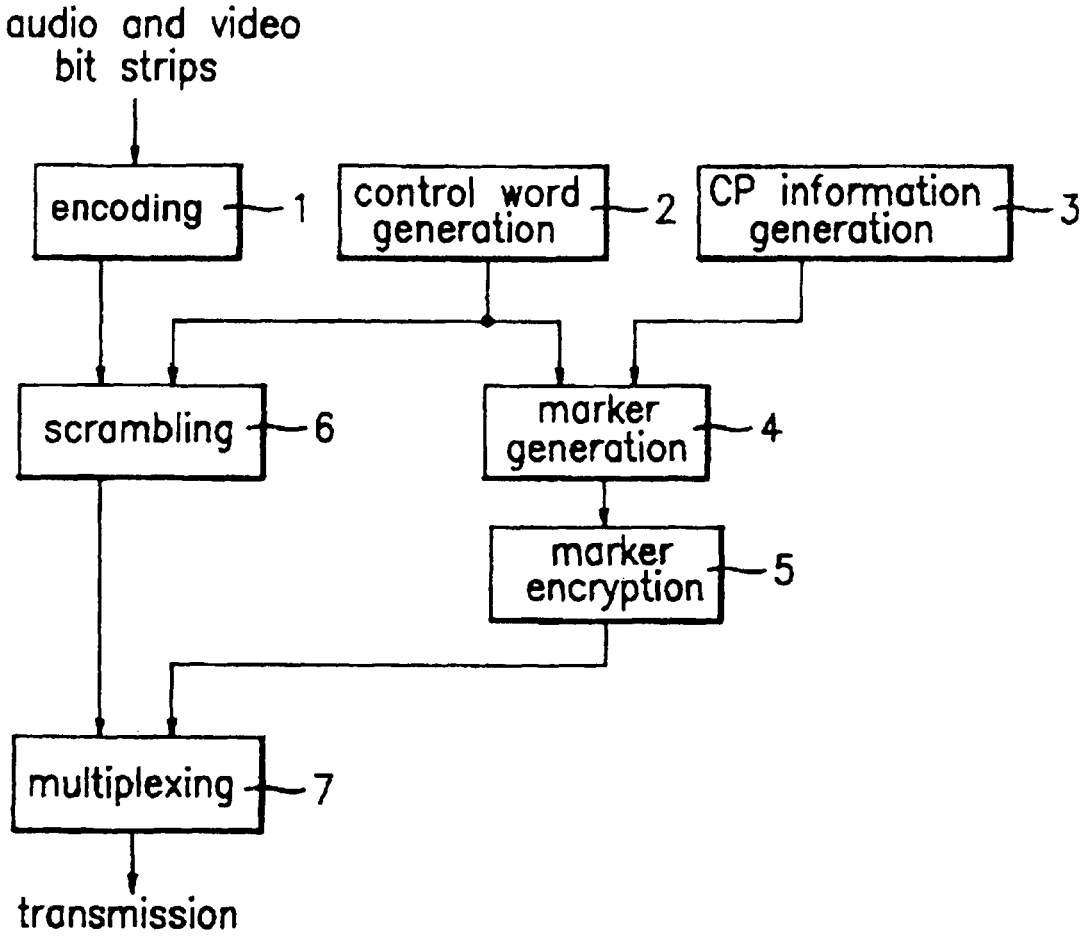
FIG. 1 is a flow chart illustrating an audio and video signal transmitting process in a copy prevention method according to the present invention.

A copy prevention method and apparatus of a digital [magnetic] recording/reproducing system according to the present invention [emphasizes a fact that a DVCR can record all diverse signals on a video tape, so that a variety of input signals are largely classified into two, and different] *use a* copy prevention [methods are performed for each signal] *method based on the type of input signal*.

First, signals transmitted from a terrestrial broadcasting *system*, a satellite broadcasting *system* and a pay television broadcasting *system* are classified as [a] broadcasting [signal] *signals*, and the following three copy prevention functions are applicable when recording [the] *a* broadcasting signal.

[Three] *The three* copy prevention functions are a no recording [onto a video tape] *permitted*, a free record/copy [onto the tape], and a single generational recording [onto the tape with no copy of the recorded tape].

Here, the third *copy prevention* function [of the single generational recording onto the video tape with no duplication of the recorded tape] is for enabling the signal from a television receiver to [record on the tape] *be recorded* once but [inhibiting] the re-recording of the signal by means of [another], *for example, a* DVCR *is prohibited* while the firstly-recorded [tape] *signal* can be reproduced to watch through a monitor.

A second classification is for, *for example,* a rental tape to be identified by a pretaped signal. Here, the copy prevention function of the pretaped signal is similar to the above no recording [onto the tape] and the free record/copy [onto the tape] *copy protection function*, [which] *and* has the following three *copy protection* functions.

The three functions are no copy onto another tape, free copy to another tape and a single generational copy to another tape.

The single generational copy function [to the other tape is of the copy prevention function for allowing a] *allows* duplication from the original [rental tape], but [inhibiting] *inhibits* another copy from the [duplication, which is utilized in a digital audio tape (DAT)] *duplicate*.

The present invention is advantageous in that a program supplier selects the above functions when providing a program. For this purpose, the program supplier inserts desired copy prevention function information, i.e., a marker, into a predetermined field within the program.

The marker inserted [to transport data] by the program supplier prior to being transmitted is encoded, and, in order to impede an illegal copy, an encoding key for interpreting the marker is transferred via a separate transmission line such as telephone line by a prescribed period interval, e.g., once a month, to be stored within a copy prevention apparatus.

In a system having an ATV decoder incorporated *in a body* with, *for example,* the DVCR [in a body], a copy prevention apparatus for embodying the copy prevention functions executes a digital copy prevention function during an interface process between the ATV decoder and *the* DVCR[, and]. *The copy prevention apparatus* decodes and determines the marker of a received program by means of a received [encoded] *encoding* key to perform another function in accordance with respective copy prevention functions.

Figure 2:
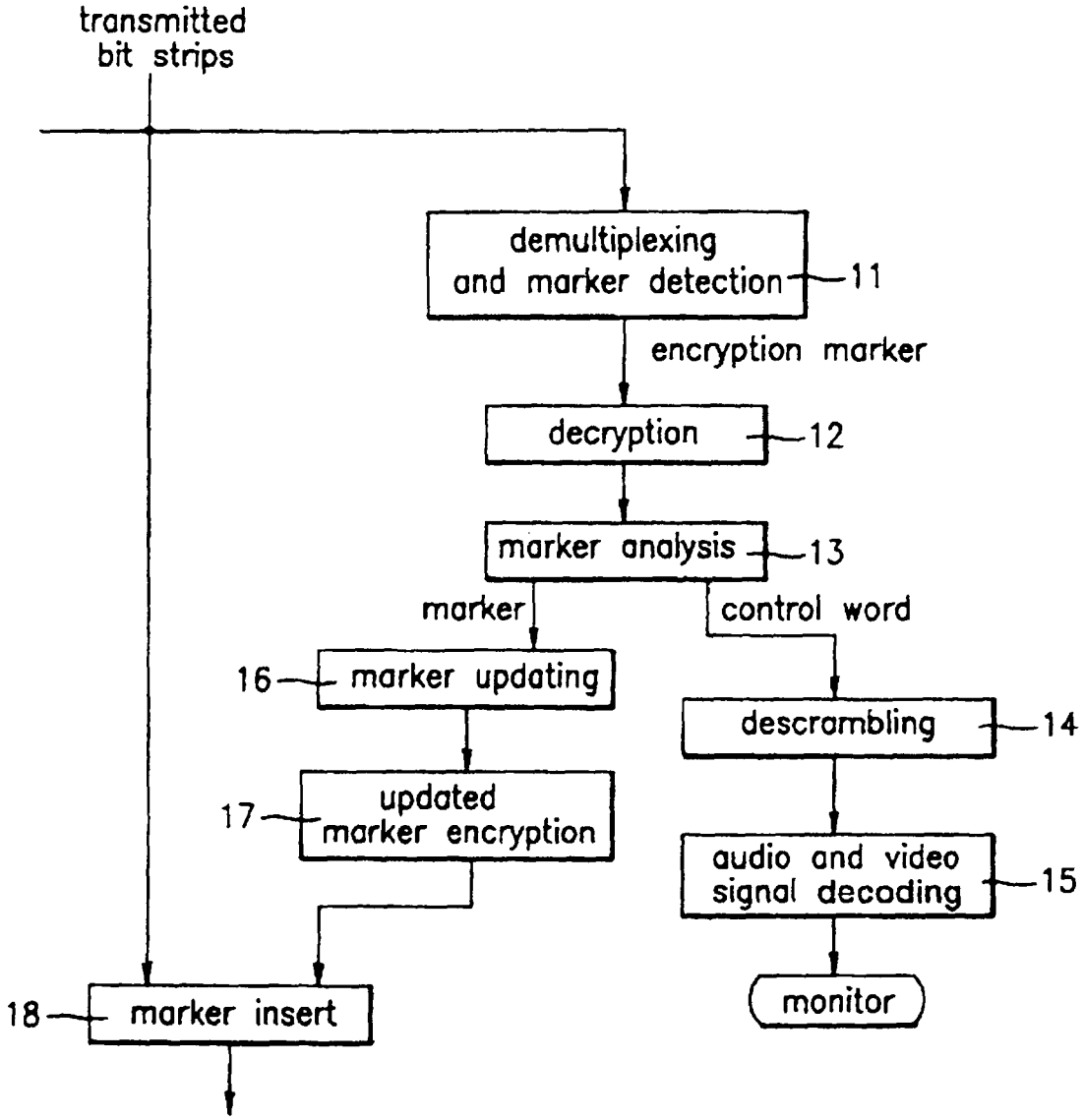
FIG. 2 is a flow chart illustrating an audio and video signal receiving and recording process in the copy prevention method according to the present invention.

The copy prevention method of the digital [magnetic] recording/reproducing system according to the present invention is performed through an audio and video signal transmitting process as shown in FIG. 1, and an audio and video signal receiving and recording process as shown in FIG. 2.

The audio and video signal transmitting process is for encrypting the marker formed by a control word for scrambling audio and video bit strips and copy prevention (hereinafter simply referred to as "CP") information for preventing an illegal duplication by means of an encoded key to multiplex and transmit the audio and video bit strips scrambled by the control word. Here, the marker is already formed by a program producer to be multiplexed and transmitted together with the audio and video bit strips.

In more detail, as shown in FIG. 1, the audio and video signal transmitting process is carried out in the sequence of an audio/video bitstrip encoding step 1 for encoding the audio and video bit strips, a control word generating step 2 for generating the control word for scrambling, and a scrambling step 6 for scrambling the encoded audio and video bit strips by means of the generated control word. Successively, a CP information generating step 3 generates the CP information for preventing the illegal copy, *and* marker producing and encrypting[.] steps 4 and 5 [generates] *respectively generate* the marker by using the generated control word and CP information and [encrypts] *encrypt* the resulting marker by means of [the encoded] *an encoding* key. Finally, a multiplexing and transmitting step 7 multiplexes the scrambled audio and video bit strips and encrypted marker to transmit the result.

The audio and video signal receiving and recording process is performed in such a manner that the marker is detected from the transmitted bit strips and is decrypted by means of the [encoded] *encoding* key and analyzed. Thus, it is determined whether the copy is permitted or not [to update the detected marker to be recorded on a video tape], *the detected marker is updated accordingly*, and the control word is produced from the marker to carry out the descrambling and display the signals on a monitor. *As a result*, [in which] the audio and video signals transmitted from the program producer are recorded or displayed in accordance with the marker.

[More specifically, as shown in] FIG. 2[.] *shows* the audio and video signal receiving and recording process [is performed by] *in detail. As shown, the process includes* marker detecting steps 11 and 12 for detecting the marker by demultiplexing the transmitted bit strips, and decrypting the marker by means of the [encoded] *encoding* key, and a marker analyzing step 13 for analyzing the detected marker to determine whether [the] *a* copy is permitted or not and *for* detecting the control word. Then, the transmitted audio and video bit strips are descrambled and decoded [by] *using* the detected control word to supply the audio and video signals in audio and video decoding steps 14 and 15. Thereafter, the detected marker is updated and encrypted by means of the [encoded] *encoding* key [to be inserted in case of permitting the copy after analyzing the marker in a] *and reinserted in the transmitted audio and video bit strips in* marker inserting steps 16, 17 and 18 *if copying is permitted*.

The above-stated process will be described in detail below.

To begin with, the program producer encodes the audio and video bit strips 1, generates the control word for scrambling 2, and scrambles the encoded audio and video bit strips by means of the generated control word 6.

Also, the CP information for preventing the illegal copy is generated 3, [and] the marker is generated by using the generated control word and CP information 4, and the coded key is utilized to perform the encryption 5.

Finally, the scrambled audio and video bit strips and encrypted marker are multiplexed 7 to be transmitted for the program recording or reproduction.

The transmitted bit strips are demultiplexed to detect the marker 11[, and the encoded]. *The encoding* key is utilized to perform the decryption and the decrypted marker is output 12. The detected and decrypted marker is analyzed to determine whether the copy is permitted or not and the control word is detected 13.

The detected control word is used for descrambling and decoding the transmitted audio and video bit strips to provide the audio and video signals to the monitor [to be displayed] *for display* 14 and 15.

In addition, when it is determined that [the] *a* copy is permitted after analyzing the marker, the detected marker is updated [to be encrypted], *re-encrypted* by means of the [encoded] *encoding* key, and the result is inserted to the audio and video bit strips to be recorded 16, 17 and 18.

Figure 3:
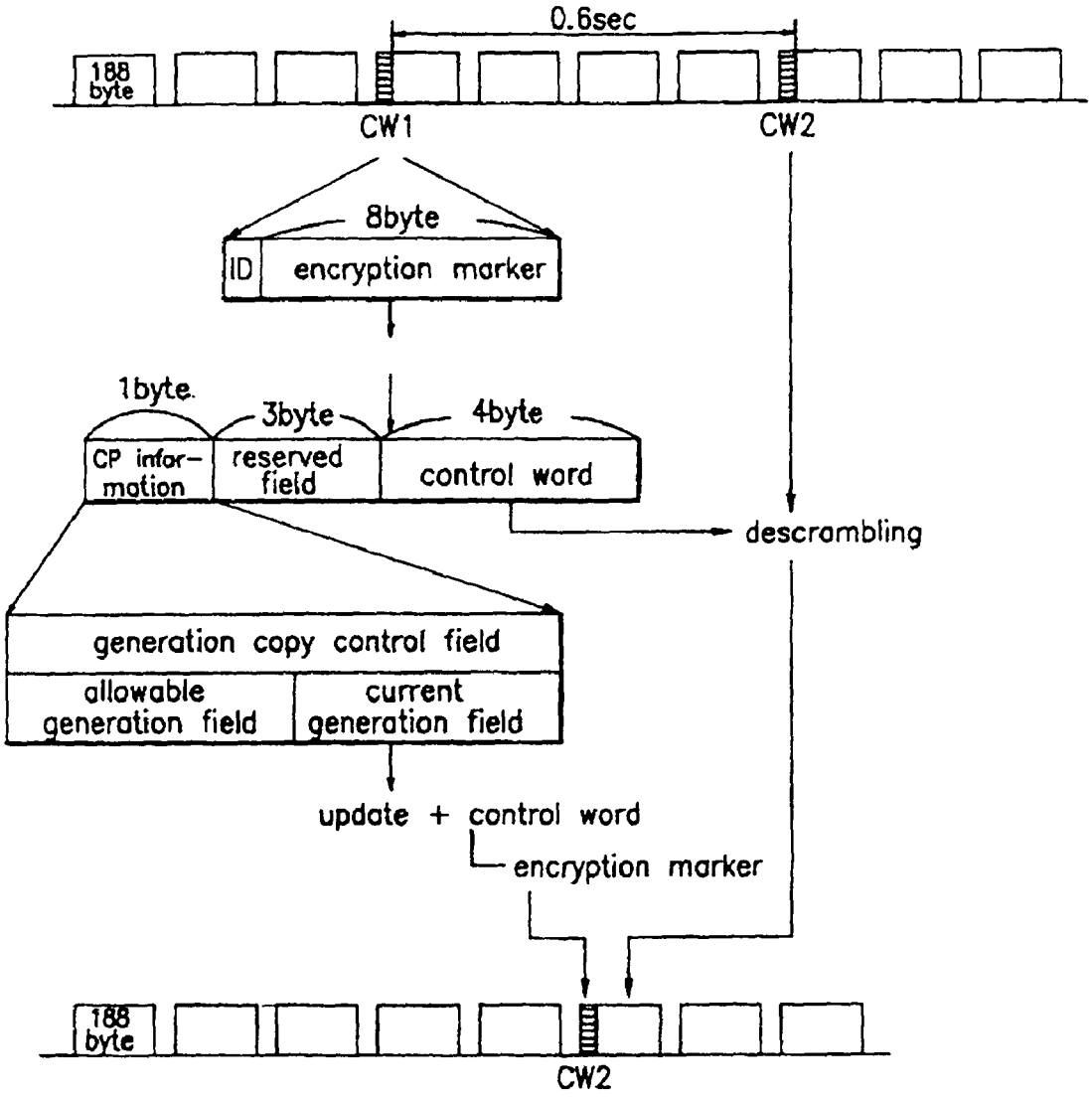
FIG. 3 is a view showing a structure of transport bit strips according to the present invention.

Here, a position of inserting the marker will be observed with reference to FIG. 3.

The transmitted bit strips [consists] *consist* of transport packets of a fixed length, i.e., 188 bytes, in which a transport header is displaced on the preceding stage of the bit strips. The transport header is divided into a field of a fixed length of 4 bytes and an adaptation field of a variable length. Then, a transport-private-data field exists as one field within the adaption field. The transport-private-data field consists of an ID field and the encrypted marker. The ID field functions as [a] *an* identifier for informing that the transport-private-data field is a field utilized for the copy prevention method according to the present invention, and the encrypted marker following the ID field embodies the copy prevention function of the present invention.

When the marker is decrypted by means of the [encoded] *encoding* key, the decrypted marker is divided into a CP information area [recorded with] *including* the CP information for preventing the illegal copy, a control word area [recorded with] *including* the control word CW for descrambling, and a reserved area.

That is, the decrypted marker is formed of 8 bytes consisting of the CP information area of one byte, the reserved area of three bytes and control word area of four bytes.

At this time, the CP information is formatted by including a generational copy control field which restricts the number of [permitting the copy] *permitted copies* of the program[, which]. *The generational copy control field* is formed of an allowable generational field for limiting the copy number of the program and a current generational field representing a current generation of the duplicated program.

Next, the marker analyzing step 13 of the audio and video receiving and recording process will be described in detail.

The marker analyzing step 13 is carried out by the CP information detecting step of detecting the CP information for preventing the illegal copy from the detected marker, a copy number limiting step of comparing the allowable generation of the allowable generational field for restricting the number of permitting the copy of the program and the current generation of the current generational field representing the current generation of the duplicated program within the detected CP information to determine whether the copy is permitted or not, and the control word detecting step of detecting the control word from the detected marker for executing the descrambling.

In other words, the CP information for preventing [the] *an* illegal copy is detected from the detected marker, and the allowable generation of the allowable generational field for limiting the copy number of the program is compared with the current generation of the current generational field representing the current generation of the duplicated program within the detected CP information to determine whether the copy is permitted or not, so that the program is recorded in case of permitting the copy[, otherwise the]. *Otherwise,* reproduction cannot be executed in case of inhibiting the copy, even though the recording is attained.

Next, the control word for descrambling is detected from the detected marker.

Here, the step of limiting the copy number is carried out by comparing the allowable generation of the allowable generational field with the current generation of the current generational field to determine whether the allowable generation is the current generation, inhibiting the copy when it is determined that the allowable generation is below the current generation, and permitting the copy when it is determined that the allowable generation is not below the current generation to proceed to the marker insertion step.

The copy number limiting step will be described below.

When the allowable generation is below the current generation after comparing the allowable generation of the allowable generational field preset by the program producer with the current generation of the current generational field representing the current copy number, the copy number exceeds the copy number preset by the program producer. Thus, [the copy cannot be further] *copying cannot be* permitted.

At this time, in order to inhibit the copy, the control word is destructed or is not output [to block the], *which blocks* reproduction [after performing] *of* the copy. This is because the audio and video bit strips are recorded under the state of being scrambled, the scrambled audio and video bit strips cannot be descrambled without the control word.

Therefore, by destructing the control word, the reproduction and display cannot be achieved even though the audio and video bit strips are recorded [to]; thereby [have] *having* the same effect [of] *as* impeding the recording of them.

At this time, since the control word is periodically changed [in the] *of an* interval of 0.6 second, the reproduction is impeded by destructing the succeeding control word even after accomplishing the recording.

Also, a control track within the video tape may be destructed to inhibit the copy *when the recording medium is a video tape*.

On the other hand, the marker is positioned on the private data field within the bit strips whenever the control word is changed.

Here, since the control word is periodically changed, the marker including the control word is received whenever the control word is changed [to be supplied].

Meantime, the marker inserting step is performed by updating the marker when the copy is permitted after analyzing the marker 16, encrypting the updated marker by means of the encoded key 17, and replacing the encrypted marker with the [following] marker to be inserted 18.

In other words, if the copy is permitted after analyzing the marker, the current generation of the current generational field is augmented by one to update the marker 16. That is, the CP information including the updated current generational field obtained by augmenting the current generation by one is summed with the control word to be the updated marker.

The updated marker is encrypted by means of the [encoded key to be replaced with] *encoding key and is inserted to replace* the succeeding marker [and inserted] 17. More specifically, as the marker is supplied whenever the control word is changed, it is inserted whenever the control word is changed.

In other [word] *words*, as shown in FIG. 3, the detection of the encrypted marker and the replacement of the updated marker should be accomplished altogether on time basis.

Meanwhile, the [encoded] *encoding* key for encrypting and decrypting the marker is transmitted via a separate transmission line in a predetermined time interval and is stored to be utilized, thereby perfectly preventing the illegal copy.

That is, the marker encrypted by the [encoded] *encoding* key is transmitted and recorded together with the bit strips. Here, the control word for descrambling the scrambled audio and video bit strips is included in the marker, so that the marker should be primarily decrypted to obtain the control word. However, since the [encoded] *encoding* key for decrypting the marker is periodically changed, it is impossible to decrypt the marker without the [encoded] *encoding* key. Accordingly, it is further difficult to illegally obtain the control word.

Figure 4:
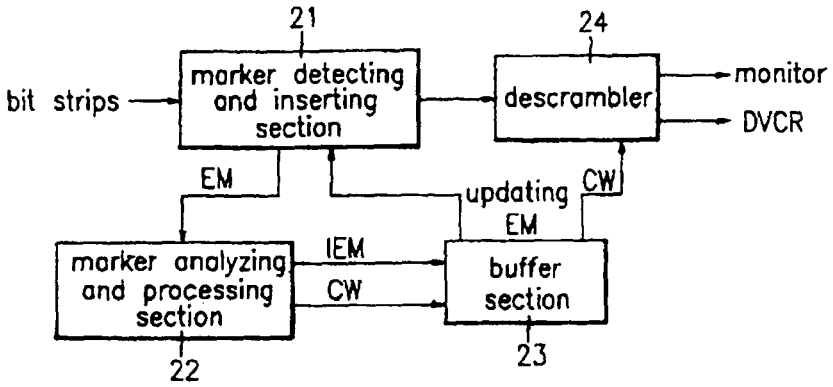
FIG. 4 is a block diagram showing a schematic construction of a copy prevention apparatus according to the present invention.

As shown in FIG. 4, the copy prevention apparatus of the digital magnetic recording/reproducing system according to the present invention includes a marker detecting/inserting section 21, a descrambler 24, a marker analyzing/processing section 22 and a buffer section 23.

Marker detecting/inserting section 21 detects the marker from the received bit strips, and inserts [to output] *the* updated marker, i.e., the updated and encrypted marker, from buffer section 23 to the bit strips.

Marker analyzing/processing section 22 utilizes the [encoded key] *encoding keys* to decrypt and analyze the encrypted marker from marker detecting/inserting section 21, thereby providing the control word CW for descrambling the bit strips. Then, the decrypted marker is updated and encrypted by the [encoded] *encoding* key [to be] *for* output.

Buffer section 23 buffers control word CW and *the* updated and encrypted marker IEM from marker analyzing/processing section 22, so that *the* updated and encrypted marker IEM is supplied to be inserted in marker detecting/inserting section 21.

Descrambler 24 descrambles the bit strips output via marker detecting/inserting section 21 by means of the control word CW from buffer section 23 to supply the result to the monitor to be displayed or to*, for example,* a DVCR to record the bit strips [inserted] with the marker.

Here, the [encoded] *encoding* key is transmitted via the separate transmission line [in] *at* a predetermined time interval and is stored as the copy prevention method of the digital magnetic recording/reproducing system according to the present invention to double a copyright protection effect.

Referring to FIG. 3, the structure of the transport bit strips and marker will be described prior to describing the operation of the copy prevention apparatus of the digital magnetic recording/reproducing system constructed as above.

In the copy prevention apparatus of the digital magnetic recording/reproducing system, the marker is placed on the transport-private-data field within the bit strips, and the CP information area recorded with the CP information for preventing the illegal copy and the control word area recorded with the control word CW for descrambling are included thereto as shown in FIG. 3, like the copy prevention method.

Here, the CP information is formatted by including the generational copy control field for restricting the number of permitted copies of the program, which is formed of the allowable generational field for limiting the copy number of the program and the current generational field representing the current generation of the duplicated program.

The marker is formed of 8 bytes consisting of the CP information area of one byte and control word area of four bytes.

Hereinbelow, an operation of the copy prevention apparatus of the digital [magnetic] recording/reproducing system according to the present invention will be briefly described with reference to FIG. 4.

First, a process of displaying the input bit strips on the monitor will be described.

The input bit strips are supplied to marker analyzing/processing section 22 under the state that the marker is detected and encrypted in marker detecting/inserting section 21.

Encrypted marker EM is decrypted by means of the [encoded] *encoding* key to be analyzed in marker analyzing/processing section 22. At this time, the control word is detected from the analyzed marker [to be buffered] via buffer section 23 for descrambling the bit strips and is supplied to descrambler 24.

The bit strips, after [detecting] *the detection of* the marker in marker detecting/inserting section 21, are descrambled in descrambler 24 in accordance with the control word from buffer section 23, and provided to the monitor [to be displayed] *for display*.

Next, a process of recording the input bit strips via*, for example,* the DVCR will be described.

The process of detecting and analyzing the marker from the input bit strips is executed in the same manner.

That is, the input bit strips [is] *are* supplied to marker analyzing/processing section 22 under the state that the marker is detected and [encrypted] *decrypted* in marker detecting/inserting section 21.

Encrypted marker EM is decrypted by means of the [encoded] *encoding* key in marker analyzing/processing section 22 to detect the control word. At this time, the recording can be performed or not in accordance with the result of the analysis. If the recording is not permitted, the detected control word is destructed to impede the reproduction even though the recording can be attained. Otherwise, the current generation of the current generational field within the marker is augmented by one to update the marker, [so that] the

[encoded] *encoding* key is utilized to encrypt the marker [to supply], *and* the result *is supplied* to buffer section 23.

The updated and encrypted marker is buffered in buffer section 23 and is supplied to marker detecting/inserting section 21 to be inserted to the input bit strips.

Meantime, the control word is periodically changed in the interval of 0.6 second, and the marker is placed on the transport-private-data field within the bit strips whenever the control word is changed.

Consequently, the updated and encrypted marker [is replaced with] *replaces* the succeeding marker [to be inserted].

The bit strips [inserted] with the updated and encrypted marker pass through descrambler 24 intact and are output to be recorded in the DVCR.

The detailed construction and operation of the copy prevention apparatus in the digital magnetic recording/reproducing system formed as above will be described with reference to the accompanying drawings.

Figure 5:
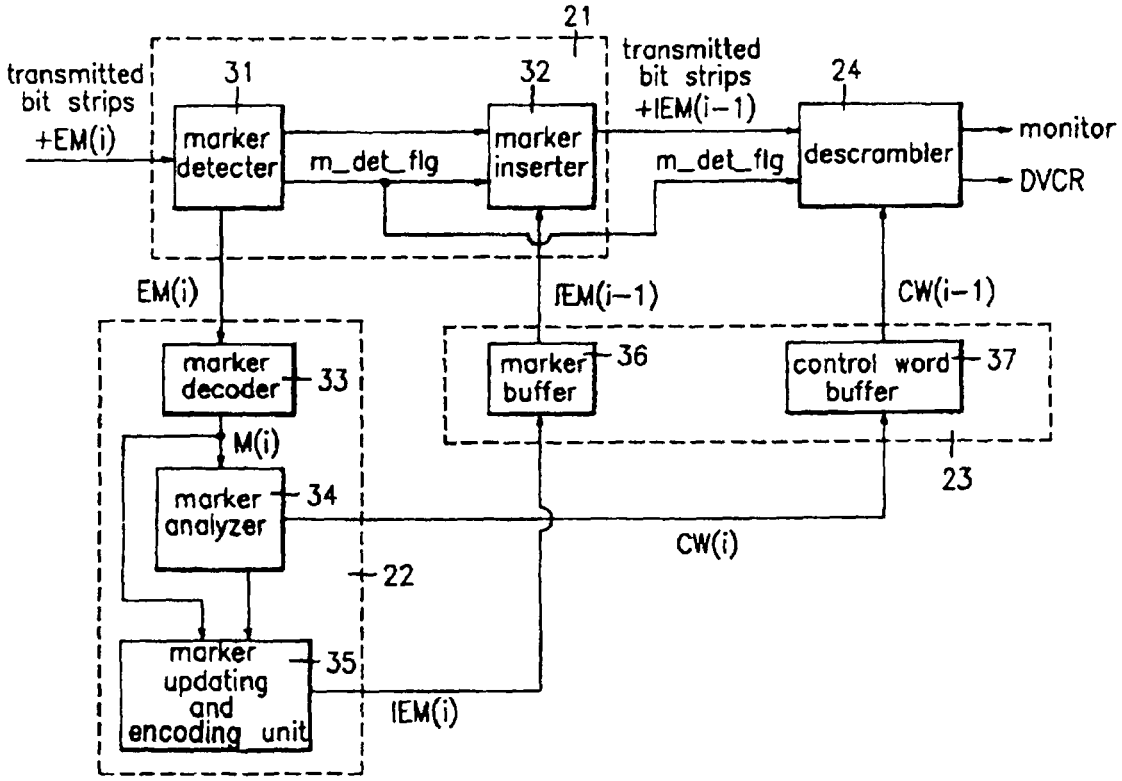
FIG. 5 is a block diagram showing a detailed construction of FIG. 4.

FIG. 5 is a detailed construction view showing the copy prevention apparatus of FIG. 4, which will be described below.

Marker detecting/inserting section 21 includes a marker detector 31 which detects the encrypted marker from the input bit strips and supplies the detected marker to marker analyzing/processing section 22 and a marker detection flag signal for informing of the position of the encrypted marker within the bit strips to descrambler 24 [to be]. *The flag is* used as a reference signal [of] *for* initializing descrambler 24 while outputting the bit strips. In addition to marker detector 31, a marker inserter 32 inserts the updated and encrypted marker from buffer section 23 [to] *into* the bit strips from marker detector 31 in accordance with the marker detection flag signal from marker detector 31 [to output the]. *The* result *is output* to descrambler 24.

Marker analyzing/processing section 22 has a marker decoder 34 for decrypting the encrypted marker from marker detector 31 of marker detecting/inserting section 21 by means of the [encoded] *encoding* key, and a marker analyzer 34 [for analyzing] *analyzes* the CP information within the marker from marker decoder 34 to output the control word to buffer section 23 when the copy is permitted while outputting a control signal for updating the marker. Additionally, a marker updating/encoding unit 35 updates the marker from marker decoder 34 in accordance with the control signal from marker analyzer 34 to encrypt the marker by means of the [encoded] *encoding* key to output the result to buffer section 23.

Here, marker analyzing/processing section 22 further includes an encoding key storage unit (not shown) for storing the [encoded] *encoding* key *and* to output the [result] *encoding key* to marker decoder 33 and marker updating/encoding unit 35.

[Besides] *Also*, marker analyzer 34 compares the allowable generation of the allowable generational field for restricting the number of permitting the copy of the program with the current generation of the current generational field representing the current generation of the duplicated program to determine whether [the] *a* copy is permitted or not.

Buffer section 23 includes a marker buffer 36 for temporally storing the updated and encrypted marker from marker analyzing/processing section 22 to supply it to marker detecting/inserting section 21, and a control word buffer 37 for temporally storing the control word from marker analyzing/processing section 22 to supply it to descrambler 24.

An operation of the copy prevention apparatus of the digital magnetic recording system according to the present invention constructed as above will be described with reference to [FIG. 6] *FIGS. 6A-6G*.

Figures 6A, 6B, 6C, 6D, 6E, 6F:
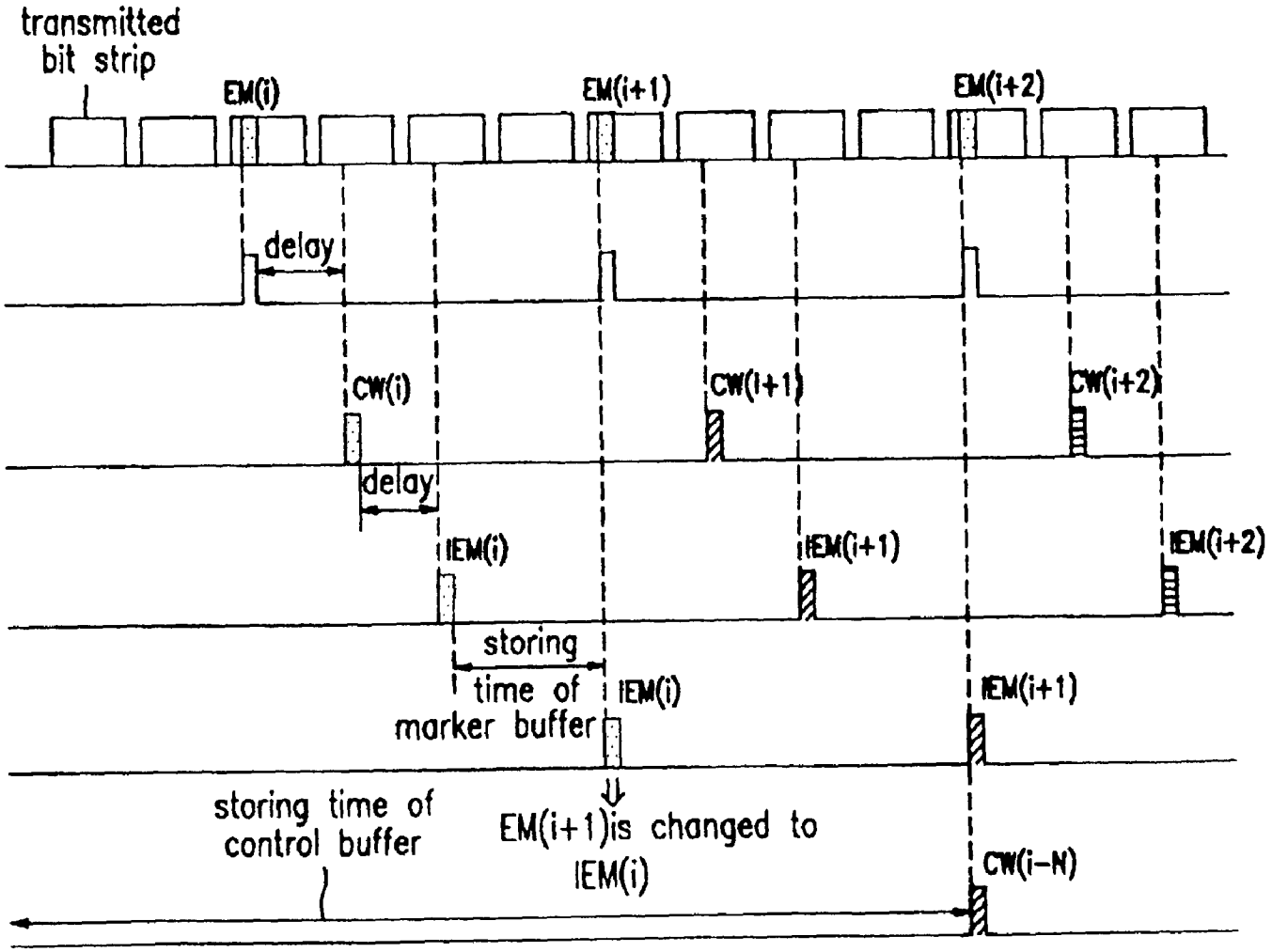
FIGS. 6A to 6F are signal waveforms of respective parts shown in FIG. 5.

FIG. 6A is a timing chart of the transmitted bit strips, FIG. 6B [is of] *illustrates* the marker detection flag m-det-flag, FIG. 6C [is of] *illustrates* the control word CW(i) from marker analyzer 34, FIG. 6D [is of] *illustrates* the updated and encrypted master IEM(i) from marker updating/encoding unit 35, FIG. 6F [is of] *illustrates* the updated and encrypted marker IEM(i) from marker buffer 36, and FIG. 6G [is of] *illustrates* the control word CW(i) from control word buffer 37.

Encrypted marker EM(i) is included in the transmitted bit strips.

The transmitted bit strips including encrypted marker EM(i) [is] *are* formed as shown in FIG. 6A, which is supplied to marker detector 31 to detect encrypted marker EM(i) to be supplied to marker decoder 33. Also, marker detector 31 generates marker detection flag signal m-det-flag for informing of the position of [the encrypted marker at] the encrypted marker EM(i) [portion] as shown in FIG. 6B, so that the generated signal is supplied to marker inserter 32 together with the bit strips including encrypted marker EM(i). Also, marker detection flag m-det-flag is supplied to descrambler 24 to be utilized as the reference signal for initializing descrambler 24 by control word CW(i−1) from control word buffer 37.

Encrypted marker EM(i) is decrypted by the encoding key in marker decoder 33 [to be] *and is* supplied as decrypted marker M(i).

Decrypted marker M(i) is analyzed in marker analyzer 34 to determine whether the copy is permitted or not. In other words, marker analyzer 34 compares the CP information within decrypted marker M(i), i.e., the allowable generational field with the current generational field, *and determines* to permit the copy when the allowable generational field is not below the current generational field.

When the copy is permitted [as above], marker analyzer 34 slightly delays control word CW(i), which is a part of decrypted marker M(i), to be supplied to control word buffer 37, as shown in FIG. 6C. At this time, marker analyzer 34 [provide] *provides* the control signal to marker updating/encoding unit 35 to control the updating of the marker.

That is, marker decoder 33 [form] *forms* decrypted marker M(i) from encrypted marker EM(i) after [delaying] a *delay* time required for the decode, and *the marker analyzer 34* generates control word CW(i) from decrypted marker M(i) [in marker analyzer 34].

At this time, control word CW(i) is transmitted to control word buffer 37 to be stored until it is utilized in descrambler 24.

Decrypted marker M(i) from marker decoder 33 is updated in accordance with the control signal from marker analyzer 34 in marker updating/encoding unit 35.

That is, the updated data is the data recorded on the current generational field within the marker, which is obtained by adding one to the previously recorded current generation.

The marker updated as described above is encrypted. i.e., encoded, in accordance with the [encoded] *encoding* key to be supplied to marker buffer 36 as shown in FIG. 6D, slightly delayed with respect to control word CW(i) from marker analyzer 34 as shown in FIG. 6C. In more detail, the encrypted marker M(i) from marker decoder 33 is supplied to marker updating/encoding unit 35 to be generated as marker IEM(i), which is updated and encrypted after [delaying the] *a*

*delay* time required for the encoding [to be], *and marker IEM(i) is* supplied to marker buffer 36.

Here, the point of generating updated and encrypted marker IEM(i) and control word CW(i) from marker updating/encoding unit 35 and marker analyzer 34 does not coincide with a point of utilizing updated and encrypted marker IEM(i) and control word CW(i) in marker inserter 32 and descrambler 24, i.e., the points of performing the replaceable insertion and initialization of descrambler 24 do not coincide with each other. Thus, updated and encrypted marker IEM(i) and control word CW(i) from marker updating/encoding unit 35 and marker analyzer 34 are temporally stored in marker buffer 36 and control word buffer 37 for that time.

As shown in FIG. 6E, updated and encrypted marker IEM (i) temporally stored in marker buffer 36 and synchronized to be output is inserted by marker inserter 32 [to] *into* the bit strips from marker detector 31.

In more detail, marker inserter 32 receives the bit strips having encrypted marker EM(i) and marker detection flag signal m-det-flag from marker detector 31, and receives updated and encrypted marker IEM(i) which will be replaceably inserted [to] *into* the position of encrypted marker EM(i) from marker buffer 36, so that updated and encrypted marker IEM(i) is replacably inserted to the position of marker detection flag signal m-det-flag in the transmitted bit strips including encrypted marker-EM(i) as shown in FIG. 6E.

In other words, marker inserter 32 inserts updated and encrypted marker IEM(i) from marker buffer 37 replacing encrypted marker EM(i+1) at the position of producing marker detection flag signal m-det-flag.

Here, the replacably inserted marker IEM(i) is formed from the immediately detected preceding encrypted marker. Accordingly, as shown in FIG. 6E, the marker IEM(i) is stored in marker buffer 37 for a certain period [to be] *and then* provided to marker inserter 32.

As shown in FIG. 6F, control word CW(i−1) *is* temporally stored in control word buffer 37 to be synchronized prior to being output *and* is utilized for descrambling the transmitted bit strips from marker inserter 32 in descrambler 24.

At this time, descrambler 24 uses marker detection flag signal m-det-flag from marker detector 31 as the reference signal for initializing *based on* control word CW(i−1) from control word buffer 37.

More specifically, descrambler 24 must be initialized by control word CW(i−N) from control word buffer 37 during a period from the point of generating encrypted marker EM(i), i.e., from a position of detecting marker detecting flag signal m-det-flag to the point before starting payload of a transport packet, where N is a natural number greater than zero. Here, control word CW(i−N) is a control word formed from encrypted marker EM(i−N) transmitted before encrypted marker EM(i) as many as N *times*. The natural number 'N' allows for arbitrarily controlling the initializing point of descrambler 24.

In the copy prevention method and apparatus of the digital [magnetic] recording/reproducing system according to the present invention as described above, a program supplier can select the copy prevention function, and the field defined within a GA format is utilized. As the result, a separate format transformation apparatus for the copy prevention function is not required, and there is no increase in data amount to be recorded to perform the copy prevention function without converting, *for example,* the general digital VCR.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

[1. A copy prevention method of a digital magnetic recording/reproducing system comprising:

an audio and video signal transmitting process of encrypting a marker formed by a control word for scrambling audio and video bit strips and copy prevention information for preventing an illegal copy by means of an encoding key, and multiplexing said marker with said audio and video bit strips scrambled by said control word, and an audio and video signal receiving/recording process of detecting said marker from said transmitted bit strips, decrypting and analyzing the detected marker by means of an encoded key to determine whether copy is permitted or not, updating said detected marker to be recorded on a video tape, and generating said control word from said marker to perform a descrambling and supply the audio and video signals to be displayed on a monitor.]

[2. A copy prevention method of a digital magnetic recording/reproducing system as claimed in claim 1, wherein said marker is placed on a transport-private-data field within said bit strips.]

[3. A copy prevention method of a digital magnetic recording/reproducing system as claimed in claim 2, wherein said marker is comprised of a copy prevention information area recorded with said copy prevention information for preventing said illegal copy, and a control word area recorded with said control word for descrambling.]

[4. A copy prevention method of a digital magnetic recording/reproducing system as claimed in claim 3, wherein said marker is formed of 8 bytes.]

[5. A copy prevention method of a digital magnetic recording/reproducing system as claimed in claim 4, wherein said copy prevention area is formed of one byte.]

[6. A copy prevention method of a digital magnetic recording/reproducing system as claimed in claim 4, wherein said control word area is formed of four bytes.]

[7. A copy prevention method of a digital magnetic recording/reproducing system as claimed in claim 3, wherein said copy prevention information is formatted by including a generational copy control field for restricting the number of permitting said copy of a program.]

[8. A copy prevention method of a digital magnetic recording/reproducing system as claimed in claim 7, wherein said generational copy control field comprises:

an allowable generational field for restricting the copy number of said program; and a current generational field representing a current generation of a duplicated program.]

[9. A copy prevention-method of a digital magnetic recording/reproducing system as claimed in claim 1, wherein said audio and video transmitting process comprises:

an audio and video bit-strip encoding step of encoding said audio and video bit strips;

a control word generating step of generating said control word for scrambling;

a scrambling step for scrambling said encoded audio and video bit strips by means of said generated control word;

a copy prevention information generating step of generating said copy prevention information for preventing said illegal copy;

a marker generating and encrypting step of generating said marker by means of said generated control word and copy prevention information and encrypting said marker by means of said encoded key; and a multiplexing and transmitting step of multiplexing to transmit said scrambled audio and video bit strips and encrypted marker.]

[10. A copy prevention method of a digital magnetic recording/reproducing system as claimed in claim 1, wherein said audio and video signal receiving/recording process comprises:

a marker detecting step of demultiplexing said transmitted bit strips to detect said marker, and decrypting said marker by means of said encoded key;

a marker analyzing step of analyzing said detected marker to determine whether said copy is permitted or not, and detecting said control word;

an audio and video decoding step of descrambling and decoding said transmitted audio and video bit strips by means of said detected control word, and outputting said audio and video signals; and a marker inserting step of updating said detected marker and encrypting said updated marker by means of said encoded key to insert the result when it is determined that said copy is permitted after analyzing said marker.]

[11. A copy prevention method of a digital magnetic recording/reproducing system as claimed in claim 10, wherein said marker analyzing step comprises:

a copy prevention information detecting step of detecting said copy prevention information for preventing said illegal copy from said detected marker;

a copy number restricting step of comparing an allowable generation of said allowable generational field and a current generation of said current generational field representing said current generation for restricting the number of permitting said copy of said program within said detected copy prevention information, and determining whether said copy is permitted or not-to process the result; and a control word detecting step of detecting said control word for descrambling from said detected marker.]

[12. A copy prevention method of a digital magnetic recording/reproducing system as claimed in claim 11, wherein said copy number restricting step comprises:

comparing said allowable generation of said allowable generational field with said current generation of said current generational field to determine whether said allowable generation is below said current generation;

inhibiting said copy when it is determined that said allowable generation is below said current generation; and permitting said copy when it is determined that said allowable generation is-not below said current generation, and proceeding to said marker inserting step.]

[13. A copy prevention method of a digital magnetic recording/reproducing system as claimed in claim 12, wherein said step of inhibiting said copy is performed by destructing said control word or impeding an output of said control word to block a reproduction after recording.]

[14. A copy prevention method of a digital magnetic recording/reproducing system as claimed in claim 10, wherein said control word is periodically changed.]

[15. A copy prevention method of a digital magnetic recording/reproducing system as claimed in claim 14, wherein said control word is changed in the interval of 0.6 second.]

[16. A copy prevention method of a digital magnetic recording/reproducing system as claimed in claim 14, wherein said marker is placed on said transport-private-data field within said bit strips whenever said control word is changed.]

[17. A copy prevention method of a digital magnetic recording/reproducing system as claimed in claim 16, wherein said marker inserting step comprises the steps of:

updating said marker when the analysis of said marker determines to permit said copy;

encrypting said updated marker by means of said encoded key; and replacably inserting said encrypted marker with a succeeding marker.]

[18. A copy prevention method of a digital magnetic recording/reproducing system as claimed in claim 1, wherein said encoded key is transported via a separate transmission line to be stored.]

[19. A copy prevention method of a digital magnetic recording/reproducing system as claimed in claim 18, wherein said encoded key is transported via said separate transmission line for a prescribed time interval.]

[20. A copy prevention apparatus of a digital magnetic recording/reproducing system comprising:

an encrypted marker detecting and inserting part for detecting a marker from input bit strips, and inserting an updated marker to said bit strips to output the result;

a marker analyzing and processing part for decrypting and analyzing the encrypted marker from said marker detecting and inserting part by means of an encoded key, outputting a control word for descrambling said bit strips, and updating and encrypting the decrypted marker by means of said encoded key to output the result;

a buffer part for buffering said control word and updated and encrypted marker from said marker analyzing and processing part, and inserting said updated and encrypted marker in said marker detecting and inserting part; and a descrambler for descrambling said bit strips provided via said marker detecting and inserting pant by means of said control word from said buffer part.]

[21. A copy prevention apparatus of a digital magnetic recording/reproducing system as claimed in claim 20, wherein said encoded key is transported via a separate transmission line to be stored.]

[22. A copy prevention apparatus of a digital magnetic recording/reproducing system as claimed in claim 21, wherein said encoded key is transported via said separate transmission line for a prescribed time interval.]

[23. A copy prevention apparatus of a digital magnetic recording/reproducing system as claimed in claim 20, wherein said marker is placed on a transport-private-data field within said bit strips whenever said control word is changed.]

[24. A copy prevention apparatus of a digital magnetic recording/reproducing system as claimed in claim 23, wherein said marker is comprised of a copy prevention information area recorded with said copy prevention information for preventing said illegal copy, and a control word area recorded with said control word for descrambling.]

[25. A copy prevention apparatus of a digital magnetic recording/reproducing system as claimed in claim 24, wherein said marker is formed of 8 bytes.]

[26. A copy prevention apparatus of a digital magnetic recording/reproducing system as claimed in claim 25, wherein said copy prevention area is formed of one byte.]

[27. A copy prevention apparatus of a digital magnetic recording/reproducing system as claimed in claim 25, wherein said control word area is formed of four bytes.]

[28. A copy prevention apparatus of a digital magnetic recording/reproducing system as claimed in claim 24, wherein said copy prevention information is formatted by including a generational copy control field for restricting the copy number of a program.]

[29. A copy prevention apparatus of a digital magnetic recording/reproducing system as claimed in claim 28, wherein said generational copy control field comprises:

an allowable generational field for restricting the number of permitting the copy of a program; and a current generational field representing a current generation of a duplicated program.]

[30. A copy prevention apparatus of a digital magnetic recording/reproducing system as claimed in claim 20, wherein said control word is periodically changed.]

[31. A copy prevention apparatus of a digital magnetic recording/reproducing system as claimed in claim 30, wherein said control word is changed in the interval of 0.6 second.]

[32. A copy prevention apparatus of a digital magnetic recording/reproducing system as claimed in claim 30, wherein said marker is placed on a transport-private-data field within said bit strips whenever said control word is changed.]

[33. A copy prevention apparatus of a digital magnetic recording/reproducing system as claimed in claim 30, wherein said marker detecting and inserting part replacably inserts said updated marker with a succeeding marker.]

[34. A copy prevention apparatus of a digital magnetic recording/reproducing system as claimed in claim 20, wherein said marker detecting and inserting part comprises:

a marker detecting section for detecting to output said encrypted marker from said input bit strips to said marker analyzing and processing part, outputting a marker detection flag signal for informing of the position of said encrypted marker within said bit strips to said descrambler to be used as a reference signal of initializing said descrambler, and outputting said bit strips; and a marker inserting section for inserting said updated and encrypted marker from said buffer part to said bit strips from said marker detecting section in accordance with said marker detection flag signal from said marker detecting section to output the result to said descrambler.]

[35. A copy prevention apparatus of a digital magnetic recording/reproducing system as claimed in claim 24, wherein said marker analyzing and processing part comprises:

a marker decoding section for decrypting said encrypted marker from said marker detecting and inserting part by means of said encoded key;

a marker analyzing section for analyzing said copy prevention information within said marker from said marker decoding section, and outputting said control word to said buffer part and a control signal for updating said marker when said copy is permitted; and a marker updating and encoding section for updating said marker from said marker decoding section in accordance with said control signal from said marker analyzing section, and encrypting said updated marker by means of said encoded key to output the result to said buffer part.]

[36. A copy prevention apparatus of a digital magnetic recording/reproducing system as claimed in claim 35, wherein said marker analyzing and processing part further comprises an encoded key storage section for storing said encoded key to output it to said marker analyzing section and marker updating and encoding section.]

[37. A copy prevention apparatus of a digital magnetic recording/reproducing system as claimed in claim 35, wherein said marker analyzing section compares an allowable generation of an allowable generational field with a current generation of a current generational field representing a current generation of a duplicated program to determine whether said copy is permitted or not.]

[38. A copy prevention apparatus of a digital magnetic recording/reproducing system as claimed in claim 20, wherein said buffer part comprises:

a marker buffer for temporally storing said updated and encrypted marker from said marker analyzing and processing part, and outputting the result to said marker detecting and inserting part; and a control word buffer for temporally storing said control word from said marker analyzing and processing part, and outputting the result to said descrambler.]

*39. A method of transmitting digital data using a data processing apparatus including a scrambler, the method comprising:*

*generating control data for initializing the scrambler;*

*initializing the scrambler based on the control data directly input into the scrambler;*

*scrambling, using the same initialized scrambler and the same control data, both digital audio data and digital video data;*

*generating a first 188 byte data block including a header with the control data used to initialize the scrambler and a scrambled data portion including the scrambled digital audio and/or digital video data;*

*generating at least a second 188 byte data block including the scrambled digital audio and digital video data and not including the control data;*

*determining if a minimum of a multiple of four 188 byte data blocks have been scrambled;*

*determining if a timing point that includes a decimal fraction of 0.66 control words per second (CW/s) has passed since a previous initialization of the scrambler;*

*re-initializing the scrambler based on a new control word when the determining steps determine either the minimum of the multiple of four 188 byte data blocks have been scrambled or the timing point that includes the decimal fraction of 0.66 control words per second ( CW/s) has passed since the previous initialization of the scrambler; and*

*transmitting, by the data processing apparatus, the generated first data block and the at least second data block.*

*40. The method of claim 39, wherein the scrambling step does not scramble the header in the first 188 byte data block.*

*41. The method of claim 43, further comprising*

*identifying the number of times the digital data has been copied and/or the number of times permitted to copy the digital data, based on copy prevention information included in the header of the first data block, wherein the copy prevention information includes at least one of current generation information and allowable generation information, the current generation information indicating the number of times the digital data has been copied and the allowable generation information indicating the number of times permitted to copy the digital data.*

*42. An apparatus for transmitting digital data, comprising:*

*a processor; and*

*a memory connected to the processor and including executable instructions that when executed by the processor, cause the processor to perform:*

*generating control data for initializing the scrambler; initializing the scrambler based on the control data;*

*scrambling, using the same initialized scrambler and the same control data, both digital audio data and digital video data;*

*generating a first 188 byte data block including a header with the control data used to initialize the scrambler and a scrambled data portion including the scrambled digital audio and/or digital video data;*

*generating at least a second 188 byte data block including the scrambled digital audio and digital video data and not including the control data;*

*determining if a minimum of a multiple of four 188 byte data blocks have been scrambled;*

*determining if a timing point that includes a decimal fraction of 0.66 control words per second (CW/s) has passed since a previous initialization of the scrambler;*

*re-initializing the scrambler based on a new control word and based on the determination that either the minimum of the multiple of four 188 byte data blocks have been scrambled or the timing point that includes the decimal fraction of 0.66 control words per second (CW/s) has passed since the previous initialization of the scrambler; and*

*transmitting the generated first 188 byte data block and the at least second 188 byte data block.*

*43. The apparatus of claim 42, wherein the executable instructions further cause the processor to perform:*

*not scrambling the header in the first 188 byte data block.*

*44. The apparatus of claim 42, wherein the executable instructions further cause the processor to perform:*

*identifying the number of times the digital data has been copied and/or the number of times permitted to copy the digital data, based on copy prevention information included in the header of the first data block, the copy prevention information including at least one of current generation information and allowable generation information, the current generation information indicating the number of times the digital data has been copied and the allowable generation information indicating the number of times permitted to copy the digital data.*

*45. The apparatus of claim 42, wherein the executable instructions further cause the processor to perform:*

*determining whether the digital data requires a copy prevention function based on identification information included in the header of the first data block, the identification information indicating whether or not at least a portion of the digital data has a data structure for copy prevention, and the controller is further configured to detect copy prevention information for controlling the copy prevention function from the digital data according to a result of this determination.*

*46. The method of claim 39, further comprising:*

*determining whether the digital data requires a copy prevention function based on identification information included in the header of the first data block, the identification information indicating whether or not at least a portion of the digital data has a data structure for copy prevention; and*

*detecting copy prevention information for controlling the copy prevention function from the digital data according to a result of this determining step.*

* * * * *